(12) United States Patent
Hayakawa et al.

(10) Patent No.: US 7,857,392 B2
(45) Date of Patent: Dec. 28, 2010

(54) VEHICLE SEATS

(75) Inventors: Hiromasa Hayakawa, Toyoake (JP);
Shingo Suzushika, Toyota (JP);
Masaharu Nakamura, Anjo (JP); Ko Ishikawa, Toyota (JP)

(73) Assignees: Toyota Boshuku Kabushiki Kaisha, Aichi-ken (JP); Aisin Seiki Kabushiki Kaisha, Aichi-ken (JP); Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 12/666,473

(22) PCT Filed: Jun. 12, 2008

(86) PCT No.: PCT/JP2008/060753
§ 371 (c)(1),
(2), (4) Date: Mar. 4, 2010

(87) PCT Pub. No.: WO2009/004905
PCT Pub. Date: Jan. 8, 2009

(65) Prior Publication Data
US 2010/0207440 A1    Aug. 19, 2010

(30) Foreign Application Priority Data
Jun. 29, 2007    (JP) .............................. 2007-171844

(51) Int. Cl.
*B60N 2/02* (2006.01)
(52) U.S. Cl. ............................. 297/378.14; 297/378.12; 297/378.1
(58) Field of Classification Search .............. 297/378.1, 297/378.12, 378.14
See application file for complete search history.

(56) References Cited

U.S. PATENT DOCUMENTS 3,901,100 A * 8/1975 Iida et al. ...................... 74/530

(Continued)

FOREIGN PATENT DOCUMENTS

JP    2002-501852    1/2002

(Continued)

OTHER PUBLICATIONS

English language Abstract of JP 2003-341392, Dec. 3, 2003.

(Continued)

*Primary Examiner*—Sarah B McPartlin
(74) *Attorney, Agent, or Firm*—Greenblum & Bernstein, P.L.C.

(57) ABSTRACT

A vehicle seat can include a stopper capable of stopping a forward tilting of a seat back at a forwardly tilted position, and a stopper operation mechanism. The stopper operation mechanism has a main pivoting member that is pivoted through an operation of a forward tilting operation lever, a sub pivoting member that is pivoted with respect to the main pivoting member, and a connection spring connecting these tilting members to each other. When the forward tilting operation lever is operated, the sub pivoting member receives a force from the connection spring to be pivoted together with the main pivoting member, causing the stopper to move to an acting position. When the stopper is pushed from the acting position toward a non-acting position, with the forward tilting operation lever being operated, the sub pivoting member receives a force from the stopper to elastically deform the connection spring, and is pivoted with respect to the main pivoting member together with the stopper.

2 Claims, 8 Drawing Sheets

U.S. PATENT DOCUMENTS

| | | | | |
|---|---|---|---|---|
| 4,146,267 | A | * | 3/1979 | Mori et al. ............... 297/367 R |
| 6,336,679 | B1 | | 1/2002 | Smuk |
| 7,086,698 | B2 | * | 8/2006 | Shiraki ................... 297/367 R |
| 7,690,728 | B2 | * | 4/2010 | Miyauchi et al. ........ 297/378.12 |
| 2004/0021355 | A1 | * | 2/2004 | Ohba ......................... 297/341 |
| 2009/0051202 | A1 | | 2/2009 | Ozeki et al. |
| 2009/0167046 | A1 | | 7/2009 | Yamagishi |
| 2009/0167068 | A1 | | 7/2009 | Yamagishi |

FOREIGN PATENT DOCUMENTS

| | | |
|---|---|---|
| JP | 2003-182416 | 7/2003 |
| JP | 2003-341392 | 12/2003 |
| JP | 2004-58928 | 2/2004 |
| WO | 2006/132127 | 12/2006 |

OTHER PUBLICATIONS

English language Abstract of JP 2003-182416, Jul. 3, 2003.
English language Abstract of JP 2004-58928, Feb. 26, 2004.
English language Abstract of JP 2002-501852, Jan. 22, 2002.
English language Abstract of WO 2006/132127, Dec. 14, 2006.
U.S. Appl. No. 12/666,443 to Hiromasas Hayakawa et al., filed Dec. 23, 2009.

* cited by examiner

VEHICLE SEATS

TECHNICAL FIELD

The present invention relates to a vehicle seat. In particular, the present invention relates to a vehicle seat that is switched between a rearwardly tilted state in which a seat back tiltably mounted to a seat cushion is rearwardly tilted, a forwardly tilted state in which the seat back is forwardly tilted, and a greatly tilted state in which the seat back is tilted further forwards beyond the forwardly tilted state.

BACKGROUND ART

There is conventionally known a vehicle seat equipped with a structure allowing switching of the seat back between a rearwardly tilted state and a forwardly tilted state (Refer to Japanese Laid-Open Patent Publication No. 2002-501852). In a seat of this type, by placing it in the forwardly tilted state, it becomes easier for the occupant to get on a seat in the rear row (a walk-in state), and, by placing it in the greatly tilted state, the luggage space is enlarged (a down state).

Figure 9:
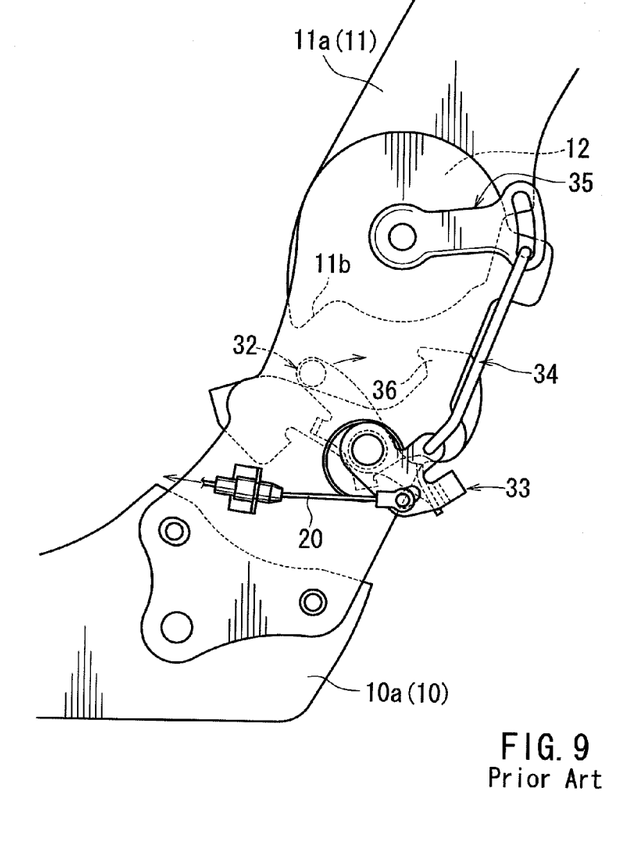
FIG. 9 is an enlarged side view of a portion of a conventional vehicle seat in a vicinity of a stopper and a reclining device.

In the conventional vehicle seat, when placing the seat back in the forwardly tilted state, a forward tilting operation lever provided on a side surface of the seat cushion is operated. As shown in FIG. 9, through this operation, a stopper operation lever 33 is tilted, and a stopper 32 is tilted clockwise. And, in synchronization with the tilting of the stopper operation lever 33, a reclining mechanism 12 is placed in a free state. When, in this state, a seat back 11 is tilted forwards, a stopper claw 11b provided on the seat back 11 pushes the stopper 32, and the stopper 32 abuts a stopper receiving portion 36 fixed to the seat cushion 10 side. As a result, due to the stopper 32, the seat back 11 is prevented from being tilted further forwards beyond the forwardly tilted position thereof.

Figure 10:
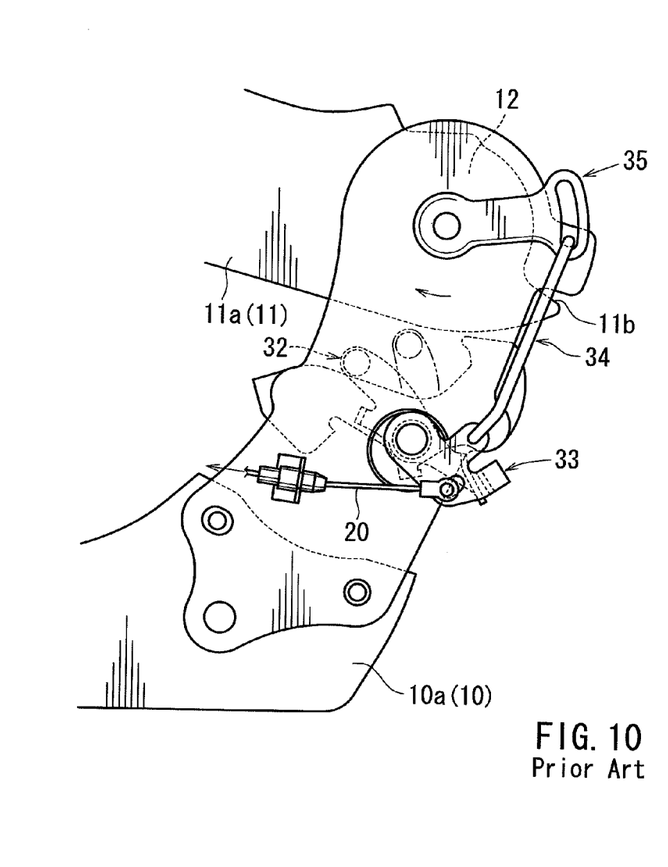
FIG. 10 is a partial enlarged side view of the conventional vehicle seat when the stopper is placed in an acting position while keeping the seat back in the greatly tilted state.

However, as shown in FIG. 10, even when the forward tilting operation lever is pulled, with the seat back 11 being in the greatly tilted state, the stopper operation lever 33 is tilted, allowing the stopper 32 to move to the acting position. Thus, when, in this state, the seat back 11 is pulled back to the rearwardly tilted state, a part of the members tilting together with the seat back 11, for example, the stopper claw 11b, abuts the stopper 32, causing damage of the components interlocked with the stopper 32.

Thus, there is a need in the art to provide a vehicle seat that is equipped with a structure which prevents damage of seat components when the seat back is pivoted from the greatly tilted state to the rearwardly tilted state while operating the forward tilting operation lever.

SUMMARY

The vehicle seat of the present invention has a stopper which stops the forward tilting of the seat back at the forwardly tilted state, a forward tilting operation lever, and a stopper operation mechanism. The stopper operation mechanism has a main pivoting member which is pivoted through operation by the forward tilting operation lever, a sub pivoting member which is pivoted with respect to the main pivoting member, and a connection spring connecting these pivoting members to each other. When the forward tilting operation lever is operated, the sub pivoting member receives a force from the connection spring to be pivoted together with the main pivoting member, causing the stopper to move to an acting position. When the stopper is pushed from the acting position toward a non-acting position, with the forward tilting operation lever being operated, the sub pivoting member receives a force from the stopper to elastically deform the connection spring, and is pivoted with respect to the main pivoting member together with the stopper.

Thus, when the seat back is pivoted from the greatly tilted state to the rearwardly tilted state while operating the forward tilting operation lever, a stopper claw or the like that is pivoted together with the seat back abuts the stopper; then, the stopper pushes the sub pivoting member, and the sub pivoting member is pivoted with respect to the main pivoting member while causing the connection spring to undergo elastic deformation. Thus, the stopper moves to the non-acting position, whereby it is possible to prevent damage of the seat components.

Further, according to the present invention, it is also possible to adopt a construction in which when the seat back is moved from the greatly tilted state toward the rearwardly tilted state while operating the forward tilting operation lever, the stopper abuts an obstacle which is pivoted together with the seat back, and the stopper is pivoted together with the sub pivoting member with respect to the main pivoting member while causing the connection spring to undergo elastic deformation, with the seat back being allowed to be pivoted from the greatly tilted state to the rearwardly tilted state. Due to this construction, even when the forward tilting operation lever is operated, it is possible to pivot the seat back from the greatly tilted state to the rearwardly tilted state. As a result, the vehicle seat is improved in terms of operability.

BEST MODE FOR CARRYING OUT THE INVENTION

Figure 1:
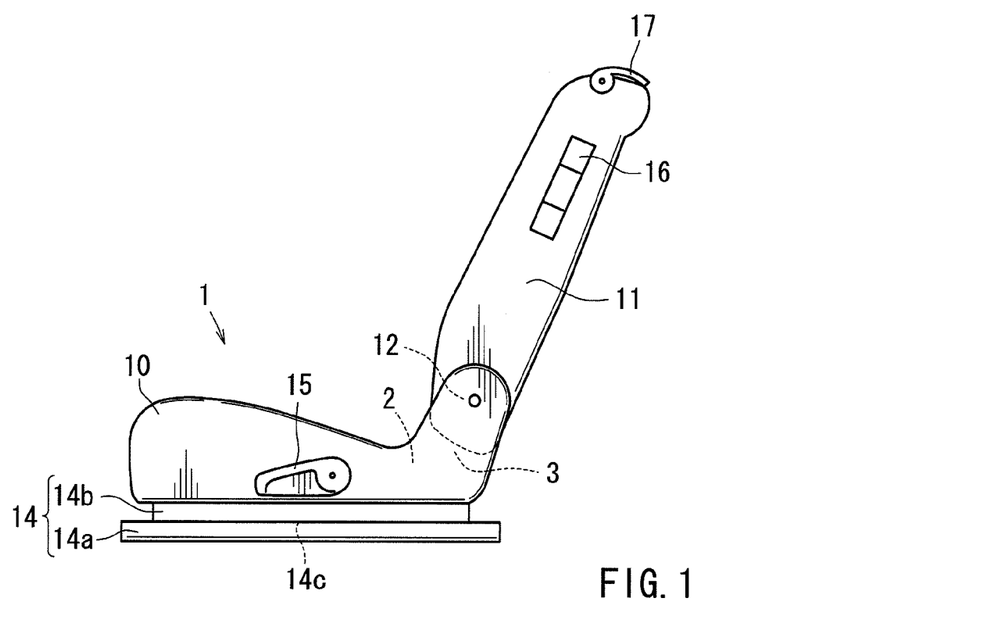
FIG. 1 is a side view of a vehicle seat with a seat back in a rearwardly tilted state.

An embodiment will be described with reference to FIGS. 1 to 8. As shown in FIG. 1, a vehicle seat 1 includes a seat cushion 10 and a seat back 11. The seat cushion 10 is mounted to a floor surface of a vehicle interior so as to be longitudinally slidable via a rail 14. The rail 14 includes an under rail portion 14a mounted to the floor surface side, an upper rail portion 14b mounted to the seat cushion 10 side so as to be longitudinally slidable with respect to the under rail portion 14a, and a lock mechanism 14c releasably retaining these rail portions.

Figure 2:
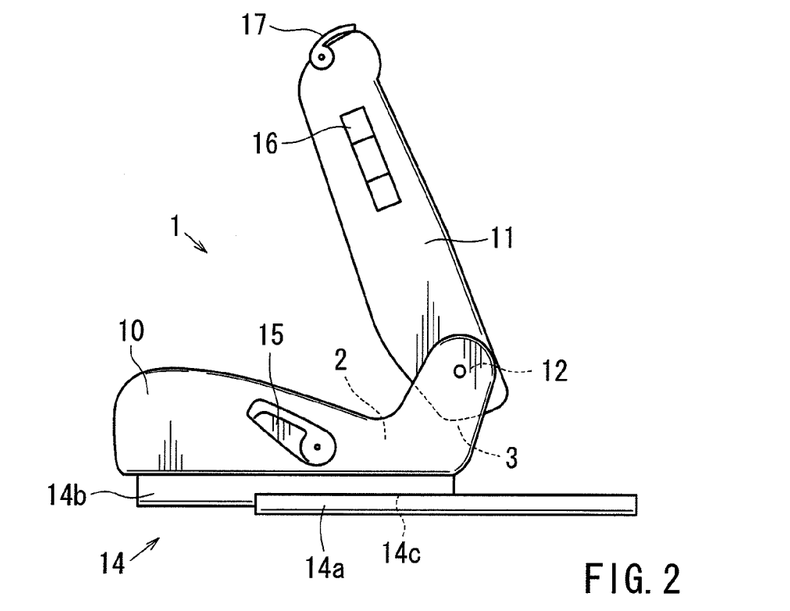
FIG. 2 is a side view of the vehicle seat with the seat back in a forwardly tilted state.
Figure 3:
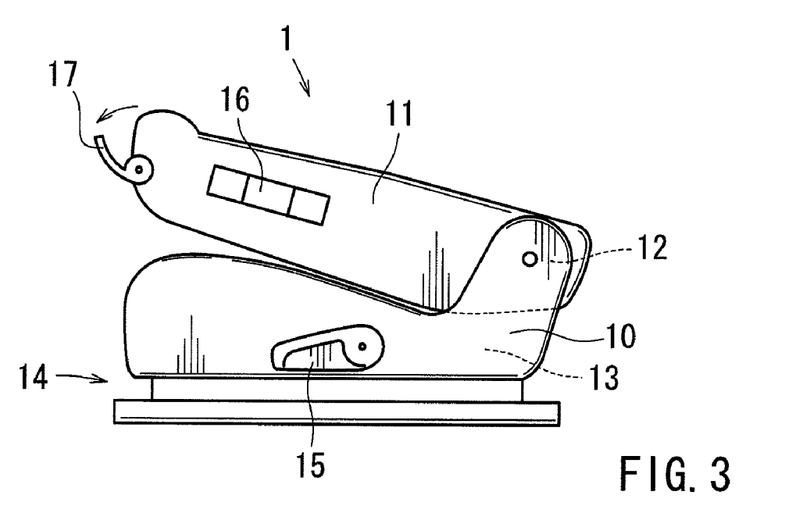
FIG. 3 is a side view of the vehicle seat with the seat back in a greatly tilted state.

The seat back 11 is pivotably mounted to the seat cushion 10 by a reclining mechanism 12, and is switched between a rearwardly tilted state shown in FIG. 1, a forwardly tilted state shown in FIG. 2, and a greatly tilted state shown in FIG. 3. On side surfaces of the seat cushion 10 and the seat back 11, there are provided forward tilting operation levers 15 and 16 that are operated for switching the seat back 11 to the forwardly tilted state. The forward tilting operation levers 15 and 16 are also used for adjusting angle of the seat back 11 in the rearwardly tilted state. On top of the seat back 11, there is provided a great tilting operation lever 17 which is operated when greatly tilting the seat back 11.

Figure 4:
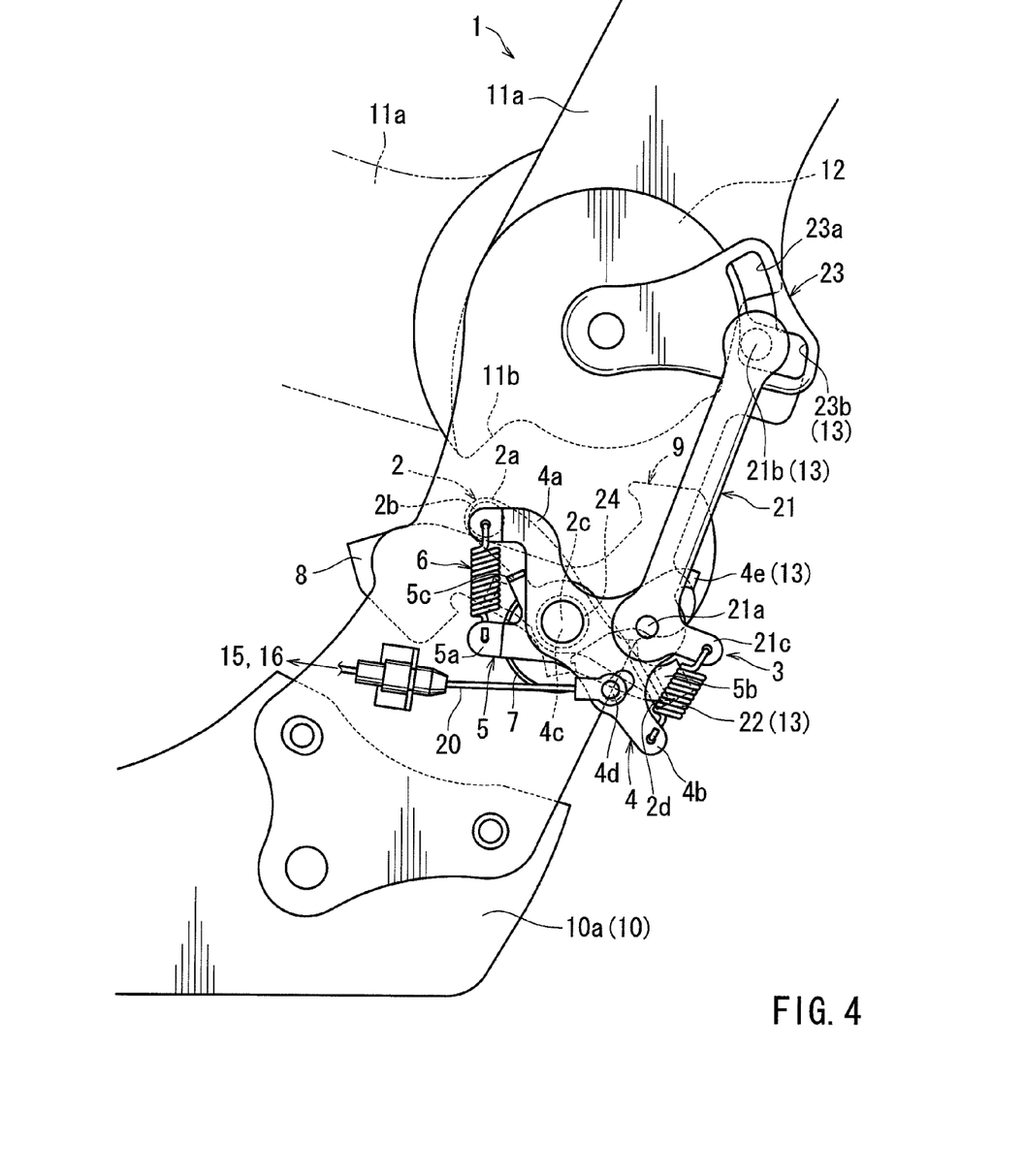
FIG. 4 is an enlarged side view of the portion of the vehicle seat in the vicinity of a stopper and a reclining device with the seat back in the rearwardly tilted state.

As shown in FIG. 2, the seat cushion 10 is provided with a stopper 2 and a stopper operation mechanism 3. The stopper 2 is a member for stopping the forward tilting of the seat back 11 at the forwardly tilted position shown in FIG. 2. As shown in FIG. 4, the stopper 2 includes a pair of plate members 2a pivotably mounted to a frame 10a of the seat cushion 10. A stopper shaft 2b extends between the forward end portions of the pair of plate members 2a, and force transmitting portions 2d receiving a force from a stopper operation mechanism 3 are formed at the rear end portions of the plate members 2a. Between the stopper 2 and the frame 10a, there is mounted an urging member 24 urging the stopper 2 toward a non-acting position (counterclockwise).

The stopper operation mechanism 3 is a mechanism capable of moving the stopper 2 in synchronization with the operation of the forward tilting lever 15 or 16. As shown in FIG. 4, the stopper operation mechanism 3 is mounted to the seat cushion 10 at a position on an upper side of paper face relative to the stopper 2. The stopper operation mechanism 3 includes a base 8 mounted to the frame 10a of the seat cushion 10, a main pivoting member 4 and a sub pivoting member 5 that are pivotably mounted to the base 8, and a connection spring 6 connecting them to each other.

As shown in FIG. 4, at the center of the main pivoting member 4, there is provided a shaft portion 4c tiltably mounted to the base 8. Formed on the lower side portion of the main pivoting member 4 is a lock portion 4d to which a cable 20 is engaged, and the cable 20 is pulled through operation of the tilting operation lever 15 or 16. Formed on the upper side portion of the main pivoting member 4 is a connection portion 4a to which one end portion of the connection spring 6 is connected.

As shown in FIG. 4, the other end portion of the connection spring 6 is connected to a connection portion 5a formed on the front side portion of the sub pivoting member 5. Thus, the sub pivoting member 5 is urged clockwise with respect to the main pivoting member 4 by the connection spring 6. On the other hand, formed on the front side portion of the sub pivoting member 5 is a positioning portion 5c which is held in contact with the main pivoting member 4 to regulate the clockwise pivoting thereof with respect to the main pivoting member 4. When the forward tilting operation lever 15 or 16 is operated to pivot the main pivoting member 4 clockwise via the cable 20, the sub pivoting member 5 is pulled by the connection spring 6 to be pivoted clockwise together with the main pivoting member 4. And, a force transmitting portion 5b formed at a rear end portion of the sub pivoting member 5 pushes the force transmitting portions 2d formed at the rear end portion of the stopper 2.

Figure 5:
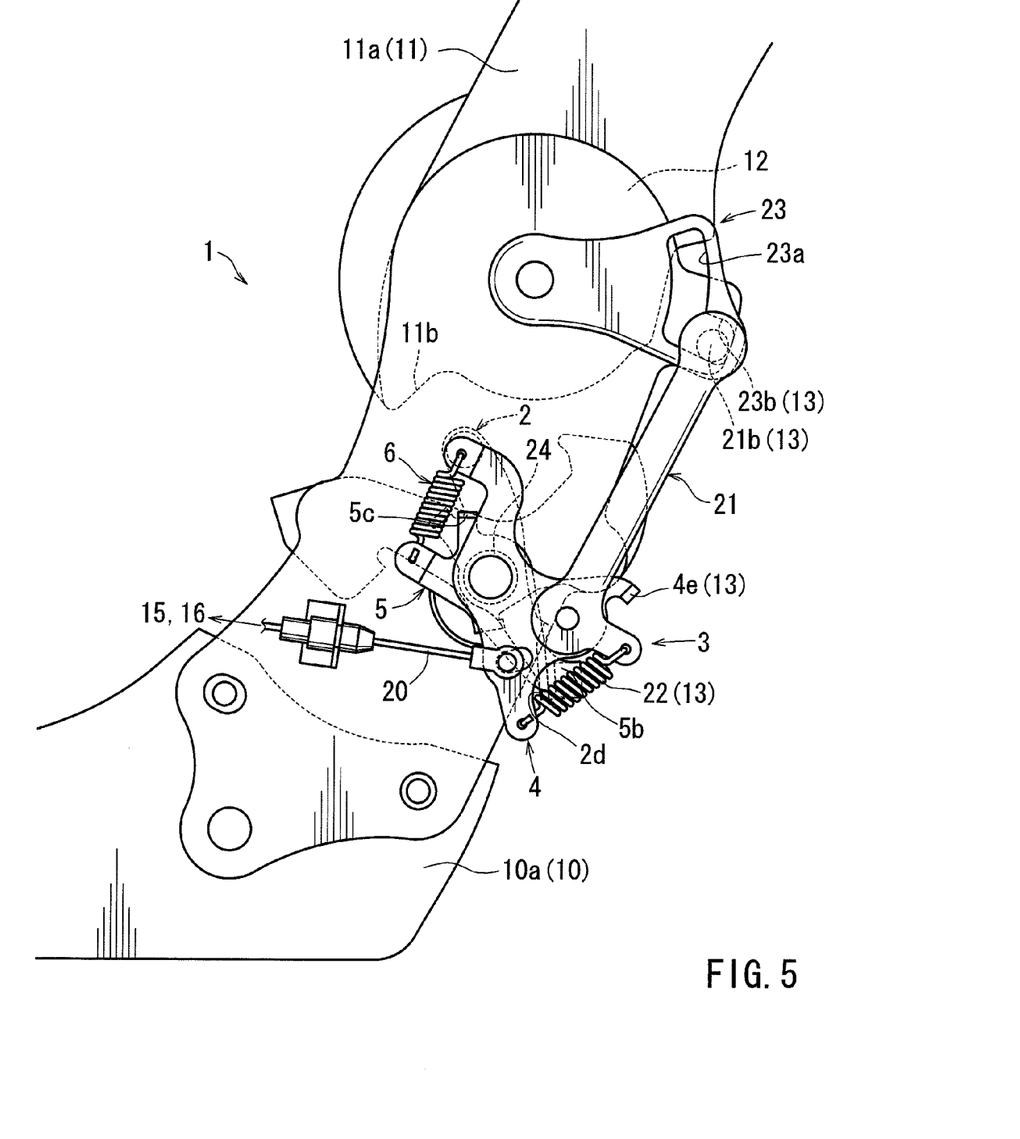
FIG. 5 is an enlarged side view of the portion of the vehicle seat in the vicinity of the stopper and the reclining device in a process through which the seat back is placed in the forwardly tilted state.
Figure 6:
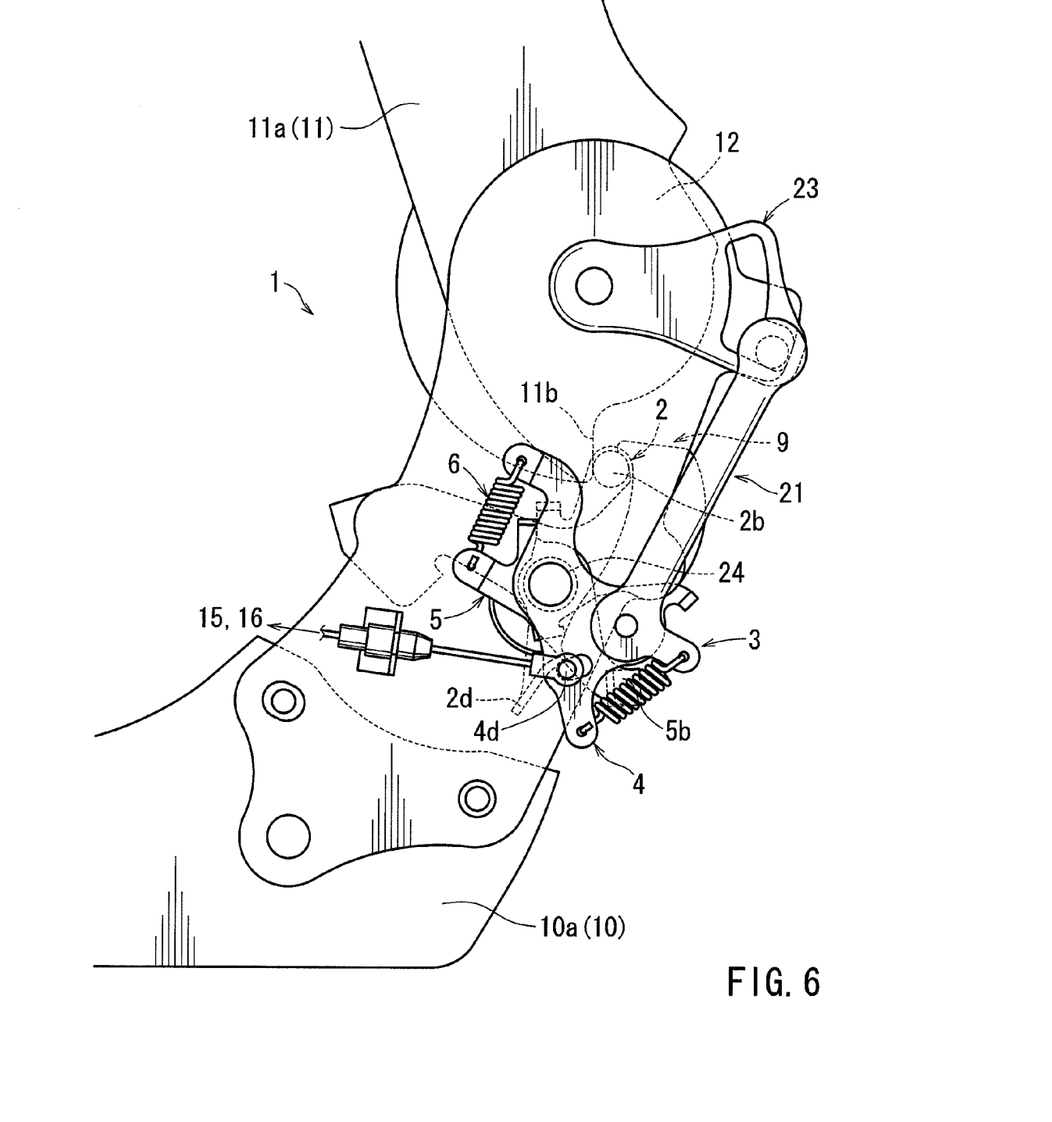
FIG. 6 is an enlarged side view of the portion of the vehicle seat in the vicinity of the stopper and the reclining device with the seat back in the forwardly tilted state.

As a result, the stopper 2 is pivoted around a central portion 2c thereof from the non-acting position shown in FIG. 4 to an acting position shown in FIG. 5. At the acting position, the stopper shaft 2b protrudes into a pivoting path of a stopper claw 11b formed on the seat back 11. Thus, when the seat back 11 is pivoted counterclockwise, the stopper claw 11b pushes the stopper shaft 2b, and the stopper 2 is pivoted to cause the stopper shaft 2b to abut a stopper receiving portion 9 fixed to the seat cushion 10 side. As a result, the pivoting of the seat back 11 is regulated by the stopper 2, and the seat back 11 is placed in the forwardly tilted state shown in FIG. 2.

As shown in FIG. 4, a reclining mechanism 12 is provided between the seat cushion 10 and the seat back 11. The reclining mechanism 12 connects the seat back 11 and the seat cushion 10 so as to allow switching between a free state in which the seat back 11 and the seat cushion 10 can be pivoted each other, and a lock state in which they can't be pivoted each other. The reclining mechanism 12 is placed to the free state by downwardly pivoting a reclining lever 23 formed at a central portion of the reclining mechanism 12. And, when the reclining lever 23 is upwardly pivoted by the urging force of an urging member (not shown), the reclining mechanism 12 is placed in the lock state. Further, the reclining mechanism 12 is provided with a free zone where the lock state is not attained while the seat back 11 is pivoted to a front position beyond the use-range angle.

As shown in FIG. 4, the reclining lever 23 has an arcuate elongated hole 23a. One end portion 21b of a connection lever 21 is movably connected to the elongated hole 23a, and the other end portion 21a of the connection lever 21 is pivotably connected to the main pivoting member 4. Thus, when the main pivoting member 4 is pivoted clockwise as shown in FIG. 5, the reclining lever 23 is pivoted downwards via the connection lever 21, and the reclining mechanism 12 is placed in the free state.

As shown in FIG. 4, between the main pivoting member 4 and the reclining lever 23, there is provided a retaining mechanism 13 including a regulating structure for regulating a movement of the one end portion 21b of the connection lever 21 along the elongated hole 23a. The regulating structure includes a standby hole 23b formed so as to be radially and outwardly continuous with the elongated hole 23a, an urging member 22 urging the connection lever 21, and a pivoting regulating portion 4e capable of regulating the pivoting of the connection lever 21. The urging member 22 is stretched between a connection portion 21c formed at the lower end portion of the connection lever 21 and a rear side connection portion 4b formed at the rear end portion of the main pivoting member 4. The urging member 22 urges the connection lever 21 to thereby urge one end portion 21b toward the standby hole 23b.

As shown in FIG. 4, the pivoting regulating portion 4e is formed at the rear end portion of the main pivoting member 4, and protrudes to the rear end edge of the connection lever 21. Thus, the clockwise pivoting of the connection lever 21 is regulated by the pivoting regulating portion 4e, and one end portion 21b of the connection lever 21 is retained in the elongated hole 23a. When the main pivoting member 4 is pivoted clockwise, the pivoting regulating portion 4e moves to a canceling position, whereby one end portion 21b of the connection lever 21 moves to the standby hole 23b.

In the rearwardly tilted state shown in FIG. 1, the seat back 11 allows angle adjustment within a predetermined rearward tilting range. More specifically, by pulling the operation lever 15, the reclining mechanism 12 is placed in the free state. And, in this state, the seat back 11 is tilted to a desired rearward tilting angle. In this state, the operation of the operation lever 15 is canceled to place the reclining mechanism 12 in the lock state.

When the seat back 11 is to be placed in the forwardly tilted state shown in FIG. 2 from the rearwardly tilted state shown in FIG. 1, the forward tilting operation lever 15 or 16 is first operated. As a result, the stopper operation mechanism 3 is pivoted clockwise as shown in FIGS. 4 and 5, and the stopper 2 is pivoted to the acting position. At the same time, the reclining lever 23 is pivoted clockwise via the connection lever 21, and the reclining mechanism 12 is placed in the free state. Subsequently, as shown in FIG. 5, the connection lever 21 is pivoted by the urging member 22, and one end portion 21b of the connection lever 21 moves to the standby hole 23b, with the result that one end portion 21b becomes incapable of moving with respect to the reclining lever 23.

When, in this state, the seat back 11 is tilted forwards, the free zone of the reclining mechanism 12 functions. When the free zone of the reclining mechanism 12 functions, the upward tilting of the reclining lever 23 is regulated. Thus, the stopper 2 is retained via the connection lever 21 and the stopper operation mechanism 3. Thus, even when the operation of the forward tilting operation lever 15 or 16 is canceled, the stopper 2 continues to be retained at the acting position.

Figure 8:
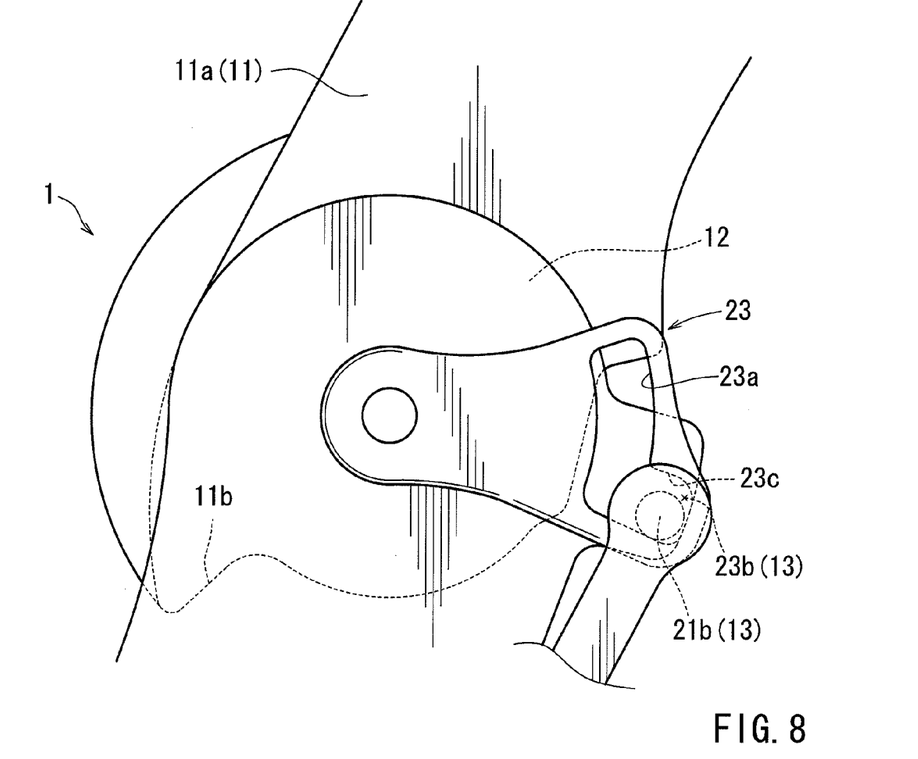
FIG. 8 is an enlarged detailed side view of a retaining mechanism while the seat back is placed in the forwardly tilted state.

That is, when the operation of the forward tilting operation lever 15 or 16 is canceled in the state (the state shown in FIG. 5) in which the free zone of the reclining mechanism 12 functions to regulate the upward pivoting of the reclining lever 23, the main pivoting member 4 tends to return to the position shown in FIG. 4. At this time, the connection lever 21 also tends to return to the position shown in FIG. 4. However, as shown in FIG. 8, the upward pivoting of the reclining lever 23 is regulated, so that an upper wall 23c of the standby hole 23b traverses the movement path of one end portion 21b of the connection lever 21, and one end portion 21b of the connection lever 21 abuts the upper wall 23c of the standby hole 23b. Thus, the movement of one end portion 21b of the connection lever 21 is regulated, whereby the return of the main pivoting member 4 and the connection lever 21 to the position shown in FIG. 4 is regulated. Thus, even when the operation of the forward tilting operation lever 15 or 16 is canceled, the stopper 2 continues to be retained at the acting position.

When the seat back 11 is tilted further forwards from the state of FIG. 5, the stopper 2 is pushed by the stopper claw 11b provided on the seat back 11 side, and the stopper shaft 2b abuts the stopper receiving portion 9. As a result, the seat back 11 is prevented from being tilted further forwards beyond the forwardly tilted position shown in FIG. 6 due to the stopper 2.

When the seat back 11 is to be placed in the greatly tilted state shown in FIG. 3 from the rearwardly tilted state shown in FIG. 1, the great tilting operation lever 17 is operated. As a result, the reclining mechanism 12 is placed in the free state, and the seat back 11 is tilted to the greatly tilted position in which it is laid on the seat cushion 10. And, by placing the seat back in the greatly tilted state, the reclining mechanism 12 is placed in the lock state. It is also possible to adopt an arrangement in which the lock of the lock mechanism 14c for the rail 14 is simultaneously canceled through operation of the great tilting operation lever 17 or the forward tilting operation lever 15 or 16. This makes it possible to cause the vehicle seat 1 to slide longitudinally in the forwardly tilted state shown in FIG. 2 or in the greatly tilted state shown in FIG. 3.

Figure 7:
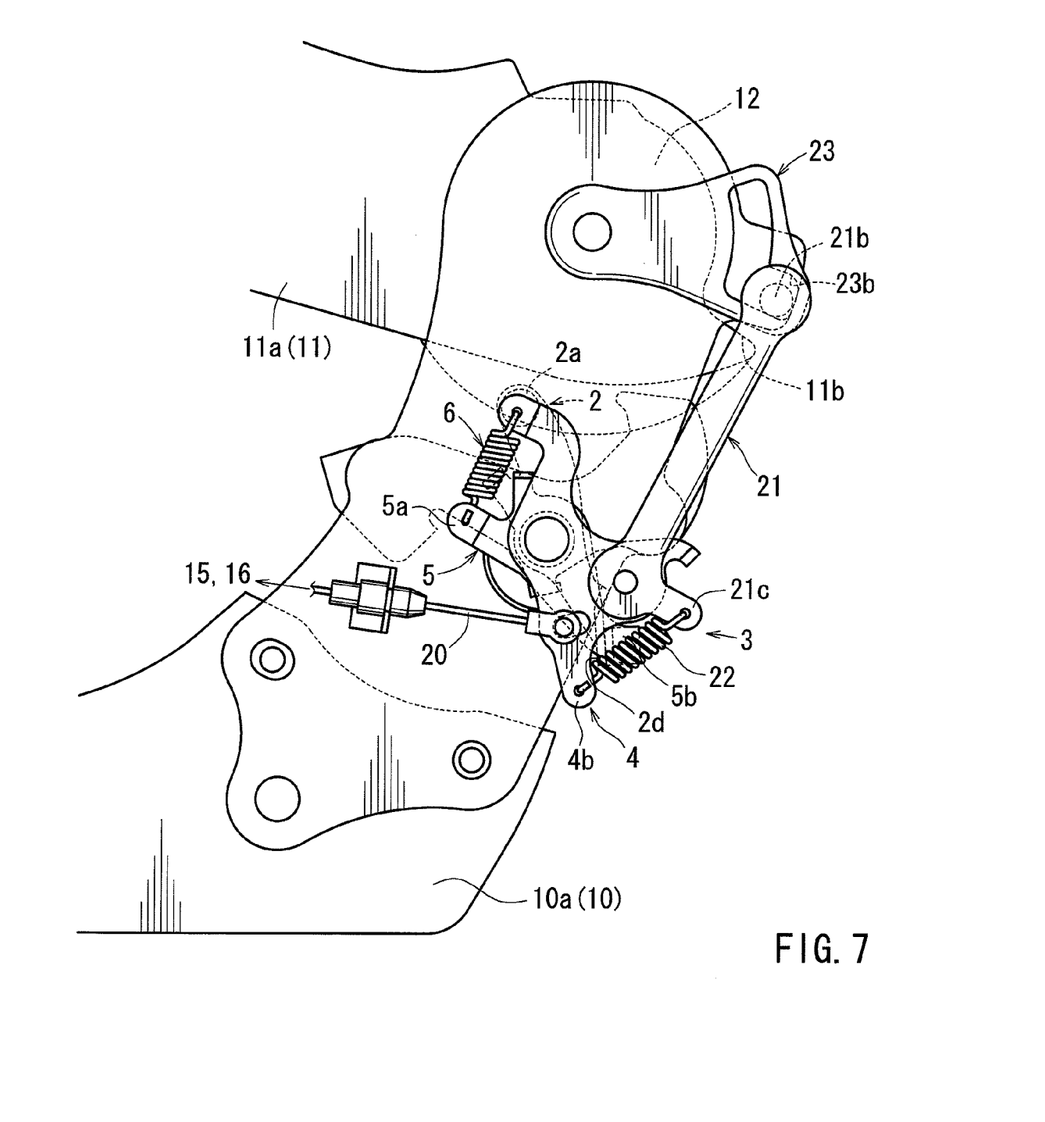
FIG. 7 is an enlarged side view of the portion of the vehicle seat in the vicinity of the stopper and the reclining device when the stopper is brought to an acting position while keeping the seat back in the greatly tilted state.

When the forward tilting operation lever 15 or 16 is operated as shown in FIG. 7, with the seat back 11 greatly tilted, the stopper operation mechanism 3 is pivoted clockwise, and the stopper 2 moves from the non-acting position to the acting position. And, through the pivoting of the stopper operation mechanism 3, the reclining mechanism 12 is placed in the free state from the lock state via the connection lever 21 and the reclining lever 23. Due to the urging member 22, one end portion 21b of the connection lever 21 moves to the standby hole 23b, and the movement of one end portion 21b with respect to the reclining lever 23 is regulated.

When, in this state, the seat back 11 is raised, the free zone of the reclining mechanism 12 functions first. Subsequently, the stopper claw 11b is pivoted clockwise together with the seat back 11 (See FIG. 7), and the stopper claw 11b pushes the stopper shaft 2b. As a result, the stopper 2 is pivoted counterclockwise, and the force transmitting portions 2d of the stopper 2 abut the force transmitting portion 5b of the sub pivoting member 5, with the stopper 2 pushing the sub pivoting member 5 counterclockwise.

As shown in FIG. 7, at this time, the main pivoting member 4 is retained at the position of FIG. 7 by the connection lever 21. Thus, the sub pivoting member 5 is pivoted counterclockwise while elastically expanding the connection spring 6. As a result, the stopper 2 moves to the non-acting position, and the seat back 11 is placed in the rearwardly tilted position of FIG. 1. Thus, it is also possible to place the seat back 11 in the rearwardly tilted state of FIG. 1 from the greatly tilted state of FIG. 3 through operation of the forward tilting operation lever 15 or 16. It is also possible to switch the seat back 11 from the greatly tilted state of FIG. 3 to the rearwardly tilted state of FIG. 1 through the primary operation, that is, by operating the great tilting operation lever 17.

This embodiment is configured as described above. That is, as shown in FIGS. 4 and 7, the stopper operation mechanism 3 includes the main pivoting member 4, the sub pivoting member 5, and the connection spring 6. And, when the forward tilting operation lever 15 or 16 is operated, the sub pivoting member 5 receives a force from the connection spring 6 and is pivoted together with the main pivoting member 4, causing the stopper 2 to move to the acting position. When the stopper 2 is pushed from the acting position toward the non-acting position while operating the forward tilting operation lever 15 or 16, the sub pivoting member 5 receives a force from the stopper 2 to elastically deform the connection spring 6, and is pivoted with respect to the main pivoting member 4 together with the stopper 2. Thus, it is possible to prevent damage of the seat components.

When, as shown in FIG. 7, the seat back 11 is moved from the greatly tilted state toward the rearwardly tilted state while operating the forward tilting operation lever 15 or 16, the stopper 2 abuts an obstacle (e.g., the stopper claw 11b) pivoting together with the seat back 11, and the stopper 2 is pivoted with respect to the main pivoting member 4 together with the sub pivoting member 5 while elastically deforming the connection spring 6, with the pivoting of the seat back 11 being permitted from the greatly tilted state to the rearwardly tilted state. Thus, even when the forward tilting operation lever 15 or 16 is operated, it is possible to pivot the seat back 11 from the greatly tilted state to the rearwardly tilted state. As a result, the vehicle seat 1 is improved in terms of operability.

The present invention is not restricted to the above embodiment but allows adoption of the following configurations.

(1) As shown in FIG. 4, the stopper operation mechanism 3 of the above embodiment includes a tension spring, which expands elastically, as the connection spring 6. However, it is also possible to adopt a configuration in which a compression spring is used as the connection spring, with the spring being elastically contracted when the stopper abuts the obstacle.

(2) While, as shown in FIG. 4, the above embodiment uses a coil spring as the connection spring 6, it is also possible to adopt a plate spring, rubber or the like.

The invention claimed is:

1. A vehicle seat in which a seat back pivotably mounted to a seat cushion is switched between a rearwardly tilted state in which the seat back is rearwardly tilted, a forwardly tilted state in which the seat back is forwardly tilted, and a greatly tilted state in which the seat back is tilted further forward beyond the forwardly tilted state, comprising:

a stopper that stops a forward tilting of the seat back at the forwardly tilted state;

a forward tilting operation lever operable to place the seat back in the forwardly tilted state; and a stopper operation mechanism that causes the stopper to move from a non-acting position to an acting position in synchronization with an operation of the forward tilting operation lever, wherein:

the stopper operation mechanism includes a main pivoting member that is pivoted through an operation of the forward tilting operation lever, a sub pivoting member that is pivoted with respect to the main pivoting member, and a connection spring connecting the main and the sub pivoting members to each other, when the forward tilting operation lever is operated, the sub pivoting member receives a force from the connection spring to be pivoted together with the main pivoting member from a first position to a second position to cause the stopper to move to the acting position, and when the stopper is pushed from the acting position toward the non-acting position, with the forward tilting operation lever being operated, the sub pivoting member receives a force from the stopper to elastically deform the connection spring so that the sub pivoting member is pivoted with respect to the main pivoting member together with the stopper while the main pivoting member is held in the second position.

2. The vehicle seat as in claim 1, wherein when the seat back is moved from the greatly tilted state toward the rearwardly tilted state while operating the forward tilting operation lever, the stopper abuts an obstacle that is pivoted together with the seat back, and the stopper is pivoted with respect to the main pivoting member together with the sub pivoting member while causing elastic deformation of the connection spring, so that a pivoting of the seat back from the greatly tilted state to the rearwardly tilted state is permitted.

* * * * *

UNITED STATES PATENT AND TRADEMARK OFFICE
CERTIFICATE OF CORRECTION

PATENT NO.        : 7,857,392 B2
APPLICATION NO.   : 12/666473
DATED             : December 28, 2010
INVENTOR(S)       : H. Hayakawa et al.

It is certified that error appears in the above-identified patent and that said Letters Patent is hereby corrected as shown below:

Title Page, Item (73) Assignees, please change "Boshuku" to --Boshoku--.

Title Page 2, Item (56), under Other Publications, please change "Hiromasas" to --Hiromasa--.

Signed and Sealed this
Ninth Day of August, 2011

David J. Kappos
*Director of the United States Patent and Trademark Office*